Patented Mar. 7, 1933

1,900,734

UNITED STATES PATENT OFFICE

FRANZ POHL, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF DRIERS FOR VARNISHES, LACQUERS, OIL PAINTS, AND THE LIKE

No Drawing. Application filed September 12, 1928, Serial No. 305,613, and in Germany October 25, 1927.

I have found that very valuable driers for varnishes, lacquers, oil paints and the like can be prepared in a simple manner by treating the mixtures, or fractions of the same, obtainable by the oxidation of mineral waxes such as crude or purified paraffin wax, Montan wax and the like, with non-alkaline metal compounds so as to convert them into products which are insoluble, or only sparingly soluble, in water. The crude oxidation products consist mainly of organic acids of high molecular weight and contain some unsaponifiable matter the nature of which has not been ascertained, but which probably consists of higher alcohols and small amounts of hydrocarbons.

For commercial purposes the crude oxidation products of paraffin wax, Montan wax and the like will suffice, but, generally speaking, it is advantageous to employ the acids obtainable from the crude mixtures by saponification and separation from the unsaponifiable constituents present. For example, the oxidation products of paraffin wax, Montan wax and the like may be treated with alkali or substances having an alkaline reaction such as caustic soda, sodium carbonate, ammonia, and the like, if desired in the presence of water. In most cases, the unsaponifiable constituents are easily separated, after this saponifying treatment by merely leaving them to settle down. The unsaponifiable constituents are then removed, and the solution containing the alkali metal salts of the acids present is treated at an elevated temperature with salts or other compounds of the metals defined below. Precipitates are formed which coalesce into a pasty condition at an elevated temperature thereby losing the major portion of their water. The compounds thus obtained may be rendered completely anhydrous by heating with or without the aid of a vacuum.

According to the choice of the metallic compounds employed in the preparation of the products insoluble or sparingly soluble in water, the driers obtained possess different properties. For example, oxids or salts of the most vergent non-alkaline metals, such as aluminium, zinc, manganese, copper, mercury, cobalt, lead and many others, may be employed, and also mixtures of salts such as of lead and manganese, cobalt and lead, or cobalt, zinc and manganese or the like. The drier obtained by using cobalt salts alone is of a dark violet color that from lead compounds alone, deep yellow, that from zinc alone is pale brown, and that from copper alone, deep green. The consistency of these driers ranges from that of ointment to pitch. They possess satisfactory solubility in fats, fatty oils and the like, at from about 100 to 140 degrees centigrade and considerably improve the drying properties of the same, but in different degrees. For example, linseed oil varnishes containing 1 per cent of the cobalt drier obtained according to the present invention, dry in 4 to 5 hours at room temperature, whereas drying takes about 10 to 12 hours if corresponding driers are used containing manganese or zinc in place of cobalt. The driers according to the present invention produce light coloured, inodorous varnishes, and the resulting dried coatings are limpid, elastic and only slightly colored.

As regards the percentage of metal contained therein the driers according to the present invention approximately resemble the resinates and linoleates hitherto largely used for the same purpose. They are very soluble in organic solvents, such as lacquer benzine and the like, some of them in the proportion of 1 to 2. They are also valuable for anti-corrosive purposes, ships bottom paints and the like.

It is sometimes advantageous to use these driers in conjunction with other drying or non-drying media, such as metal salts of high molecular organic acids of natural origin, as for example resinates, oleates, stearates, naphthenates and the like, which may also be formed from their components in the process of manufacturing the driers for example by precipitating the metal salts of the said acids conjointly with those of the oxidation products mentioned above. The pure driers or the said mixtures of the same may also be melted down with linseed oil, wood oil, resin and the like, whereby improved distribution, increased solubility and better drying properties are obtained.

The following examples will further illustrate the nature of the said invention which however is not limited thereto. The parts are by weight.

Example 1

1 part of the crude oxidation product from paraffin wax, or the corresponding amount of acids isolated therefrom, is heated to from about 100 to 140° centigrade with about 0.3 part of cobalt acetate, in the presence or absence of water. A wine coloured paste is produced which is well adapted for use as a drier, and can be mixed, if desired, in the proportion of 1 to 2 for example with lead-manganese naphthenate.

Example 2

1 part of the oxidation product from paraffin wax is saponified with about 0.4 part of 40° Beaumé caustic soda solution, preferably with a further addition of water.

After removing the unsaponifiable constituents the resulting product is precipitated preferably at an elevated temperature with 0.25 part of manganous chlorid or other metallic compounds, such as aluminium sulphate, copper sulphate, mercuric chloride and the like, or mixtures of the same. The conversion product is dehydrated in any known and suitable manner.

The procedure is similar when oxidation products of Montan wax are employed.

Example 3

2 parts of the oxidation product obtainable from paraffin wax and 0.6 part of cobalt acetate are heated to from 100 to 140° C. whereupon 1 part of manganese naphthenate is intimately stirred into the mass. The product obtained is a valuable drier for many commercial purposes.

In a similar manner a lead-manganese drier can be prepared from the said oxidation products and can be mixed, if desired, for example with lead-manganese linoleate.

Example 4

1 part of the saponified oxidation product obtainable in accordance with Example 2 is mixed with sodium resinate and then treated with manganous chlorid in the warm as mentioned in the said Example 2. A mixed drier is obtained which after dehydrating it, can be employed in the usual manner.

Example 5

1 part of the oxidation product of paraffin wax is treated at about 125° C. with 0.6 part of lead acetate, 1 part of linseed oil, and 0.5 part of ester gum. The pasty product obtained can be diluted with boiled linseed oil whereby the drying of the latter is considerably accelerated.

Also other metal compounds prepared according to the foregoing examples can be melted with linseed oil, resins, artificial resins and the like, if desired in conjunction with metal resinate, linoleates, stearates, naphthenates or mixtures thereof or the saponified paraffin oxidation products or solutions thereof can also be mixed with saponified or saponifiable fats, oils or resins, and precipitated by metal salts for the production of mixed driers and which can be purified by filtering and washing, if desired.

The resulting products can be dissolved in organic solvents, such as oil of turpentine, lacquer benzine or oils (for example linseed oil) and can be used, if desired in conjunction with dyestuffs such as Victoria green base, pigments, color lakes, or substrata, such as titanium white, for the production of lacquers, varnishes or paints and similar purposes.

What I claim is:

1. The process of producing driers for varnishes, lacquers, oil paints and the like which comprises acting with a compound of a metal selected from the group consisting of aluminium, zinc, manganese, copper, mercury, cobalt and lead on oxidation products of mineral waxes.

2. The process of producing driers for varnishes, lacquers, oil paints and the like which comprises acting with a compound of a metal selected from the group consisting of aluminium, zinc, manganese, copper, mercury, cobalt and lead on oxidation products of mineral waxes while warming the mixture.

3. The process of producing driers for varnishes, lacquers, oil paints and the like which comprises saponifying oxidation products of mineral waxes, separating the unsaponifiable constituents and acting on the saponified constituents with a compound of a metal selected from the group consisting of aluminium, zinc, manganese, copper, mercury, cobalt and lead.

4. The process of producing driers for varnishes, lacquers, oil paints and the like which comprises saponifying oxidation products of numeral waxes by means of an alkaline agent, separating the unsaponfiable constituents and acting on the saponified constituents with a compound of a metal selected from the group consisting of aluminium, zinc, manganese, copper, mercury, cobalt and lead.

5. The process of producing driers for varnishes, lacquers, oil paints and the like, which comprises acting with compounds of at least one metal selected from the group consisting of aluminium, zinc, manganese, copper, mercury, cobalt and lead on oxidation products of mineral waxes.

6. The process of producing driers for varnishes, lacquers, oil paints and the like, which comprises acting with compounds of at least one metal selected from the group consisting of aluminium, zinc, manganese, copper, mercury, cobalt and lead on oxidation products of mineral waxes, while warming.

7. The process of producing driers for varnishes, lacquers, oil paints and the like which comprises acting with a mixture of salts of metals selected from the group consisting of aluminium, zinc, manganese, copper, mercury, cobalt and lead on oxidation products of mineral waxes.

8. The process of producing driers for varnishes, lacquers, oil paints and the like which comprises acting with a compound of a metal selected from the group consisting of aluminium, zinc, manganese, copper, mercury, cobalt and lead on oxidation products of mineral waxes while warming and adding driers consisting of metal salts of high molecular acids of natural origin.

9. A modification of the process of producing driers for varnishes, lacquers, oil paints and the like claimed in the preceding claiming clause which comprises acting with at least one compound of a metal selected from the group consisting of aluminium, zinc, manganese, copper, mercury, cobalt and lead on a mixture of oxidation products of mineral waxes with a material containing high molecular organic acids of natural origin.

10. The process of producing driers for varnishes, lacquers, oil paints and the like which comprises acting with a cobalt salt on an oxidation product of paraffin wax while warming.

11. The process of producing driers for varnishes, lacquers, oil paints and the like which comprises acting with a cobalt salt and manganese salt on an oxidation product of paraffin wax while warming.

12. As new articles of manufacture driers for varnishes, lacquers, oil paints and the like comprising the water-insoluble salts of a metal selected from the group consisting of aluminium, zinc, manganese, copper, mercury, cobalt and lead, with the mixture of acids contained in oxidized mineral waxes.

13. As new articles of manufacture driers for varnishes, lacquers, oil paints and the like comprising the water insoluble salts of a metal selected from the group consisting of aluminium, zinc, manganese, copper, mercury, cobalt and lead with a fraction of the mixture of acids contained in oxidized mineral waxes.

14. As new articles of manufacture driers for varnishes, lacquers, oil paints and the like comprising the water-insoluble salts of a metal selected from the group consisting of aluminium, zinc, manganese, copper, mercury, cobalt and lead with the mixture of acids contained in oxidized mineral waxes and metal salts of high molecular acids of natural origin.

15. As new articles of manufacture driers for varnishes, lacquers, oil paints and the like comprising the pasty, wine-colored water-insoluble cobalt salt of a crude oxidation product of paraffin wax.

16. As new articles of manufacture driers for varnishes, lacquers, oil paints and the like comprising the pasty, water-insoluble mixture of cobalt and manganese salts of a crude oxidation product of paraffin wax.

17. As new articles of manufacture driers for varnishes, lacquers, oil paints and the like comprising the water-insoluble salts of at least one metal selected from the group consisting of aluminium, zinc, manganese copper, mercury, cobalt and lead, with the mixture of acids contained in oxidized mineral waxes.

18. As new articles of manufacture driers for varnishes, lacquers, oil paints and the like comprising the water-insoluble salts of at least one metal selected from the group consisting of aluminium, zinc, manganese, copper, mercury, cobalt and lead, with the mixture of acids contained in oxidized mineral waxes and metal salts of high molecular acids of natural origin.

19. As new articles of manufacture the water-insoluble salts of metals selected from the group consisting of aluminium, zinc, copper, mercury, cobalt and lead, with the mixture of acids contained in oxidized mineral waxes.

20. As new articles of manufacture the water-insoluble salts of at least one metal selected from the group consisting of aluminium, zinc, manganese, copper, mercury, cobalt and lead with the mixture of acids contained in oxidized mineral waxes.

21. As new articles of manufacture the mixture of water-insoluble cobalt salts of the mixture of acids contained in oxidized mineral waxes.

22. As new articles of manufacture mixtures of water-insoluble lead and manganese salts of the mixture of acids contained in oxidized mineral waxes.

23. As new articles of manufacture the mixtures of water-insoluble lead, cobalt and manganese salts of the mixture of acids contained in oxidized mineral waxes.

In testimony whereof I have hereunto set my hand.

FRANZ POHL.